Aug. 19, 1952 T. H. CHAMBERS 2,607,896

RANDOM IMPULSE SIGNAL GENERATOR

Filed Sept. 19, 1945 2 SHEETS—SHEET 1

Inventor

TORRENCE H. CHAMBERS

By Ralph L. Chappell

Attorney

Aug. 19, 1952 T. H. CHAMBERS 2,607,896

RANDOM IMPULSE SIGNAL GENERATOR

Filed Sept. 19, 1945 2 SHEETS--SHEET 2

Inventor
TORRENCE H. CHAMBERS

By Ralph L Chappell

Attorney

Patented Aug. 19, 1952

2,607,896

UNITED STATES PATENT OFFICE 2,607,896

RANDOM IMPULSE SIGNAL GENERATOR

Torrence H. Chambers, Washington, D. C.

Application September 19, 1945, Serial No. 617,404

5 Claims. (Cl. 250—36)

Figure 1:
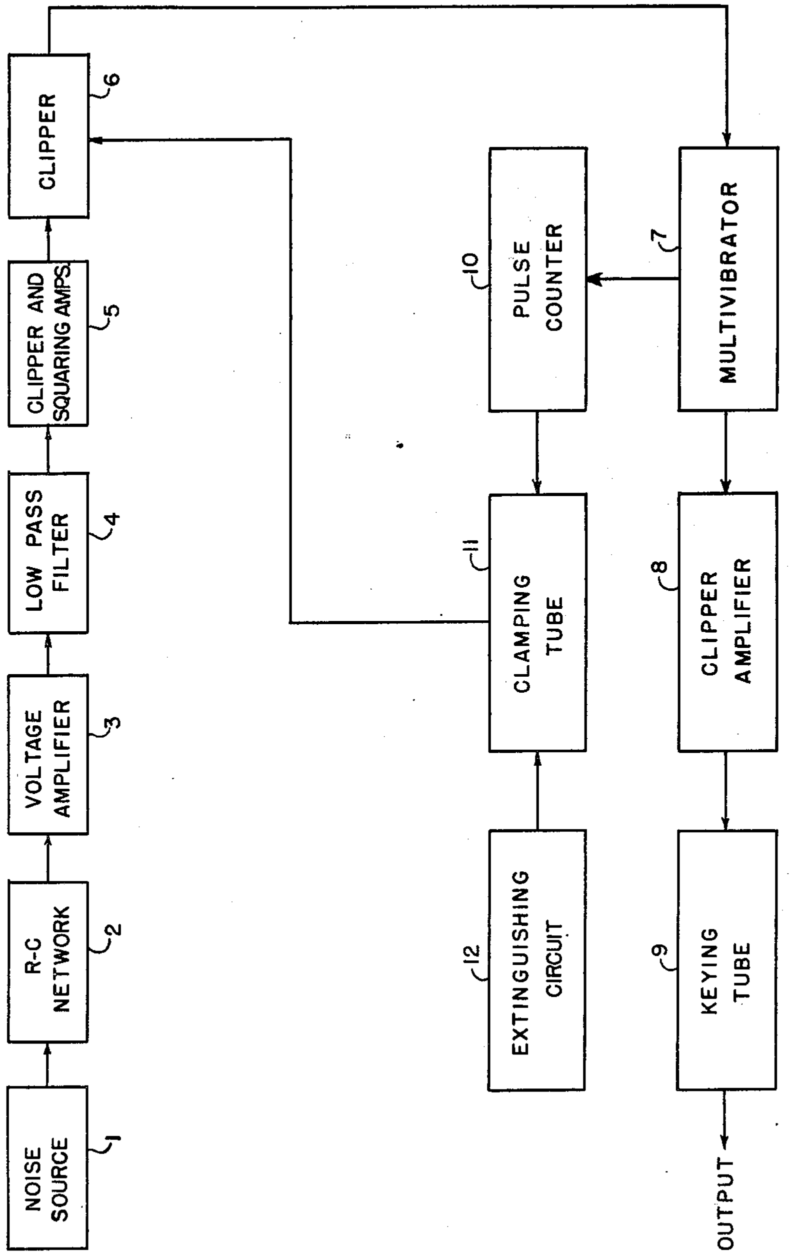

(Granted under the act of March 3, 1883, as amended April 30, 1928; 370 O. G. 757)

This invention relates to random pulse generators and is particularly directed to a random pulse generator for supplying discrete pulse trains, each train comprising a predetermined number of pulses appearing with random distribution. It is accordingly an object of this invention to supply discrete trains of random pulses.

It is another object of the invention to supply discrete trains of random pulses, each pulse train comprising a predetermined number of pulses.

It is another object of the invention to supply discrete trains of random pulses, the pulse train being supplied in irregular time spacing.

It is another object of the invention to supply discrete trains of random pulses, the pulses appearing in each train in a predetermined number in random distribution, and the pulse trains appearing with irregular time separation.

It is another object of the invention to supply discrete trains of random pulses, each train comprising an equal number of pulses appearing with random distribution in the train.

Figure 2:
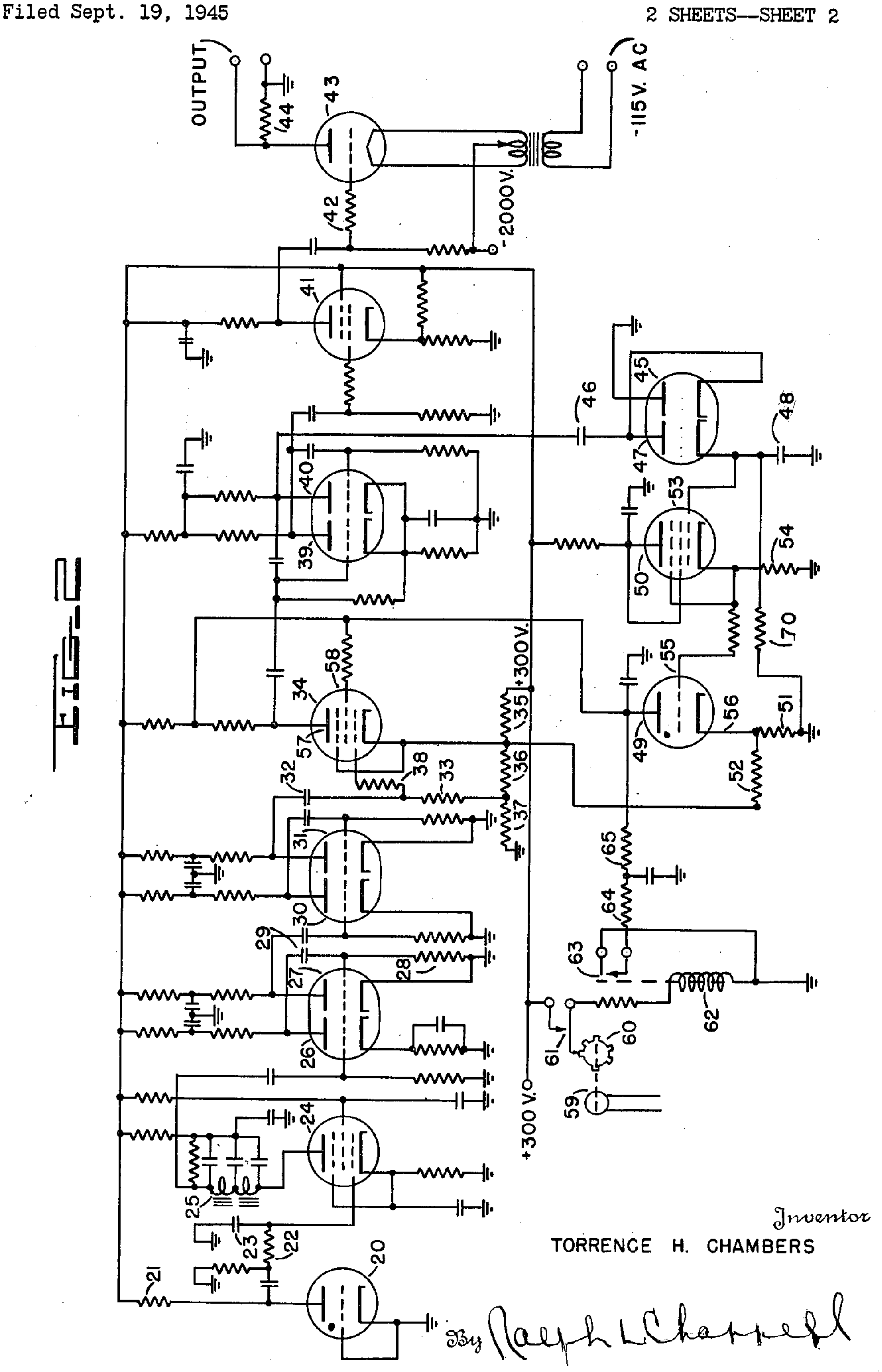

The invention will be further understood with reference to an exemplary embodiment shown in the drawings, in which:

Figure 1 shows in block diagram a pulse generator embodying the present invention, and Figure 2 shows in circuit diagram components comprising the system of Figure 1.

The signal supplied by the system of Fig. 1 is developed from a random voltage noise source 1. This noise source may conveniently employ a component carrying a current which is subject to random variation. An ionized gaseous conductor which inherently supplies a high noise level is particularly suitable therefor.

For many purposes it is desirable to supply a random pulse output lying within a limited range of recurrence intervals between the pulses, rather than to employ the entire range supplied by the noise source. When the generator output is employed as a control signal to operate other apparatus, it is desirable that the voltage output amplitude and the time duration of the individual pulses be uniform. For these purposes, the system shown in Fig. 1 employs means for filtering the frequency of the noise voltage to pass only frequencies lying within the range desired, and additionally comprises means supplying a standard impulse at the output of the network. In the embodiment of Fig. 1, a relatively low frequency range is employed.

To these ends, voltage source 1 drives a resistance capacitor network 2 which is operative to peak the noise output broadly within the desired range. This signal is then amplified at 3 and then passed through a low-pass filter 4 whose output is limited to within the desired frequency distribution.

The random noise signal voltage supplied by low-pass filter 4 is then squared up and further amplified in components 5 and 6. The output signal, comprising, a rectangular voltage wave of random duration and interval, is then developed through differentiation into a series of very short control impulse operating a multivibrator 7.

This multivibrator acts as a relay responsive to the control impulses to generate a uniform output impulse which appears at random distribution. For this purpose, an unbalanced multivibrator having one stable condition and tripped into the unstable condition by means of a control signal may be conveniently employed. The multivibrator output is further clipped in amplifier 8 from which the signal is delivered to keying tube 9 for supplying a high voltage output control signal.

The random output impulses are fed into a pulse counter circuit 10 which becomes operative to supply an output signal responsively to a desired number of impulses. In the embodiment shown in Fig. 1, the pulse counter receives impulses from the output of multivibrator 7. The counter controls a clamping tube 11 which is operative to disable the transmission channel between the noise source and the signal generator output.

In the circuit of Fig. 1, the clamping tube 11 controls clipper 6, as will further appear in connection with the description of Fig. 2.

Operation of the clamping tube after the generation of the desired number of impulses to terminate a pulse train establishes the beginning of the spacing interval between the discrete trains of pulses. It will be noted that the pulse train contains a predetermined number of pulses, appearing at random timing. Consequently, the duration of the pulse train itself is a random interval.

Reinitiation of operation of the transmission circuit between the noise source 1 and the output keying tube 9 is effected through circuit 12 which extinguishes the clamping tube and permits resumption of pulse transmission. During the train spacing interval the pulse counter 11 is reconditioned for a subsequent counting operation, and the first pulse supplied after extinction of the clamping tube defines the beginning of the succeeding pulse train. In the system of Fig. 1, the extinguishing circuit 12 is mechanically controlled and cam operated. Whereas any desired pulse spacing interval may be obtained, in the system specifically disclosed in Fig. 2 an irregular spacing is provided for.

In the schematic circuit of Fig. 2 the noise source comprises a gas tube 20 which generates irregular voltage fluctuation containing frequency components from about 20 cycles per second to several megacycles. Its load resistor 21 is chosen so that the current passing through the tube will give a maximum voltage output within the range of 20 to 1,000 cycles per second. The resistance capacity network 22 and 23 effectively attenuates frequencies above the desired range. Tube 24 is an amplifier stage which feeds low pass filter 25 which in this specific embodiment has a high frequency cut-off point of 500 cycles per second. This random noise voltage, comprised of a limited range of frequencies, is supplied to clipping tube 27 through an amplifier stage 26.

The input circuit to tube 27 is driven through input condenser 29 and the signal voltage is developed across resistor 28. This resistance capacity network has a relatively long time constant, and the grid of this tube is accordingly biased down through grid conduction to a point where negative peaks of the input signal are clipped by space current cutoff within the tube. The operating conditions within the clipping tube 30 are similar to those within tube 27, but due to the phase reversal in the latter tube, the previously unclipped extremities of the wave form are clipped within this tube to form a substantially flat top wave of random frequencies with constant amplitude.

This rectangular wave voltage is amplified in tube 31 and then is differentiated through capacity condenser 32 and resistance 33 to supply a series of small voltage pulses of uniform amplitude but random spacing to the control grid of tube 34. The cathode of this tube is biased to a relatively high positive voltage across the divider comprising resistance 35, and resistances 36 and 37 in series. Consequently, the tube conducts only positive impulses and supplies at its anode 57 a series of negative impulses which are employed to control the multivibrator circuit.

The multivibrator circuit, which is effective as a relay to generate standard output impulses of uniform voltage amplitude and time duration, consists of a pair of tubes 39 and 40. These tubes are arranged for alternate conduction in a conventional manner, and under steady state conditions, tube 39 is conductive, tube 40 being blocked by the voltage developed as grid bias across the common cathode resistance. In response to the input signals of negative polarity from tube 34, tube 39 is blocked and tube 40 goes into conduction. The pulses generated by the multivibrator in its unstable condition are of a time duration determined by the blocking time constant at the grid of tube 39. In this specific embodiment, the multivibrator output pulse was considerably longer than that of the input control pulses applied thereto from tube 34.

The positive output impulses obtained from the anode of tube 39 are applied to clipper amplifier tube 41. As in the preceding described clipping stages, the input circuit to this tube clips the negative pulse spacing interval voltage, and supplies at the output a series of random spaced negative impulses applied through limiting resistor 42 to the grid of output tube 43. The latter tube operates under a high negative cathode potential, and is normally conductive. Consequently, at its anode there appears a negative voltage relative to ground carrying high positive impulses which reach substantially ground potential upon cutoff.

The transmission channel between the noise source and the output circuit is interrupted after generation of a predetermined number of impulses to establish termination of an impulse train. This operation is attained through a counter circuit receiving the impulse signals. In the circuit diagram of Fig. 2, a condenser type of counter is employed to develop an increasing voltage with each succeeding impulse. Voltage responsive means becoming operative at the desired level resulting from the predetermined number of impulses, operates to terminate transmission to the output circuit.

The counter receives the impulse wave form as negative polarity signals from the anode of tube 40. This signal is applied through condenser 46 to the anode of diode 47 and the cathode of diode 45. Condenser 46 will accordingly receive a charge of substantially the multivibrator output potential on the negative impulses through diode 45. At the trailing edge of the impulse, and during the succeeding spacing interval, the charge on condenser 46 is delivered through diode 47 to a larger capacitor 48. This, of course, establishes a voltage increment on capacitor 48 of fractional magnitude with respect to the multivibrator output.

From each succeeding negative multivibrator output impulse, condenser 48 receives an additional charge. This charge is applied to grid 53 of cathode follower tube 50 and establishes across its cathode resistor 54 a voltage varying with the static potential then upon condenser 48. This potential is directly applied to control grid 55 of the gaseous triode clamping control tube 49. The latter tube carries up its cathode 56 a considerable positive bias developed across cathode return resistor 51, which forms with resistor 52 a voltage divider connected to the junction of resistors 35 and 36.

The positive bias applied to cathode 56 of tube 49 is adjusted so that after the requisite number of impulse signals are applied to the counter, grid 55 reaches ionization breakdown potential within the gase tube 49 and fires the latter on or slightly after the trailing edge of the last impulse of the train. The anode of this tube is connected to the anode and screen supply of clipping amplifier tube 34, and ionization of tube 49 results in the withdrawal of effective operating potential on these elements. Thus, after the generation of the predetermined number of impulses and the application thereof to the output circuit, further transmission is effectually terminated to define a wave train.

The succeeding impulse train is initiated by a mechanical timer extinguishing the clamping control tube. For this purpose, a motor 59 is employed driving cam 60. The latter carries spaced lugs to operate switch 61. Manifestly any desired spacing may be obtained but in the embodiment shown the lugs are irregularly positioned. Switch 61 operates through relay 62 having contact 63. The anode of tube 49 is subsequently grounded through switch 63 during the portion of the spacing interval while cam switch 61 is closed.

During the closed period of switch 63, the inoperative potential applied to plate 57 and screen 58 of tube 34, which were established by ionization of tube 49, are continuously maintained. Reopening of relay switch 63 is effected through operation of cam actuated switch 61 at the termination of the train spacing interval. During this interval, subsequent to the ionization of tube 49, counter condenser 48 has discharged through resistor 70. It will be seen, therefore, that upon reopening of the cam operated switch the entire circuit is in a condition to initiate a succeeding train of random impulses.

It will be understood that the embodiment shown of the present invention is exemplary only and that the limits thereof are to be determined with reference to the appended claims.

The invention described herein may be manufactured and used by or for the Government of the United States of America for governmental purposes without the payment of any royalties thereon or therefor.

What is claimed is:

1. A random impulse signal generator comprising, a random noise voltage source, filter means connected to said source to pass noise impulses occurring within a desired frequency range, wave shaping amplifier means connected to the output of said filter, an impulse generator for producing a uniform voltage impulse in response to each impulse passed by said filter and shaping amplifier, an impulse counter connected to the output of said generator, a disabling circuit connected between said counter and said shaping amplifier to disable said amplifier after a predetermined number of pulses, reset means connected to said disabling circuit, and an interval timer actuating said reset means at independently established intervals.

2. A random impulse signal generator comprising, a random noise voltage source, filter means connected to said source to pass noise impulses occurring within a desired frequency range, wave shaping amplifier means connected to the output of said filter, an impulse generator for producing a uniform voltage impulse in response to each impulse passed by said filter and shaping amplifier, an impulse counter connected to the output of said generator, a disabling circuit connected between said counter and said shaping amplifier to disable said amplifier after a predetermined number of pulses, reset means connected to said disabling circuit, and an interval timer actuating said reset means at independently established irregular intervals.

3. A random impulse signal generator comprising, a random noise voltage source, low pass filter means connected to said source to pass noise impulses occurring below a predetermined frequency, wave shaping amplifier means connected to the output of said filter, an impulse generator for producing a uniform voltage impulse in response to each impulse passed by said filter and shaping amplifier, an impulse counter connected to the output of said generator, a disabling circuit connected between said counter and said shaping amplifier to disable said amplifier after a predetermined number of pulses, reset means connected to said disabling circuit, and an interval timer actuating said reset means at independently established intervals.

4. A random impulse signal generator comprising, a random noise voltage source, low pass filter means connected to said source to pass noise impulses occurring below a predetermined frequency, wave shaping amplifier means connected to the output of said filter, an impulse generator for producing a uniform voltage impulse in response to each impulse passed by said filter and shaping amplifier, an impulse counter connected to the output of said generator, a disabling circuit connected between said counter and said shaping amplifier to disable said amplifier after a predetermined number of pulses.

5. A random impulse signal generator comprising, a random noise voltage source, low pass filter means connected to said source to pass noise impulses occurring below a predetermined frequency, wave shaping amplifier means connected to the output of said filter, an impulse generator for producing a uniform voltage impulse in response to each impulse passed by said filter and shaping amplifier.

TORRENCE H. CHAMBERS.

REFERENCES CITED

The following references are of record in the file of this patent:

UNITED STATES PATENTS

| Number | Name | Date |
|---|---|---|
| 2,165,509 | Ring et al. | July 11, 1939 |
| 2,207,620 | Hilferty | July 9, 1940 |
| 2,230,926 | Bingley | Feb. 4, 1941 |
| 2,253,975 | Guanella | Aug. 26, 1941 |
| 2,403,918 | Grosdoff | July 16, 1946 |
| 2,411,648 | Brauer et al. | Nov. 26, 1946 |
| 2,418,521 | Morton et al. | Apr. 8, 1947 |

FOREIGN PATENTS

| Number | Country | Date |
|---|---|---|
| 355,705 | Great Britain | Aug. 24, 1931 |
| 356,111 | Great Britain | Aug. 24, 1931 |